Sept. 13, 1960  H. F. WIGTON  2,952,513
PRODUCTION OF ZIRCONIUM AND SILICON CHLORIDES
Filed Jan. 14, 1958
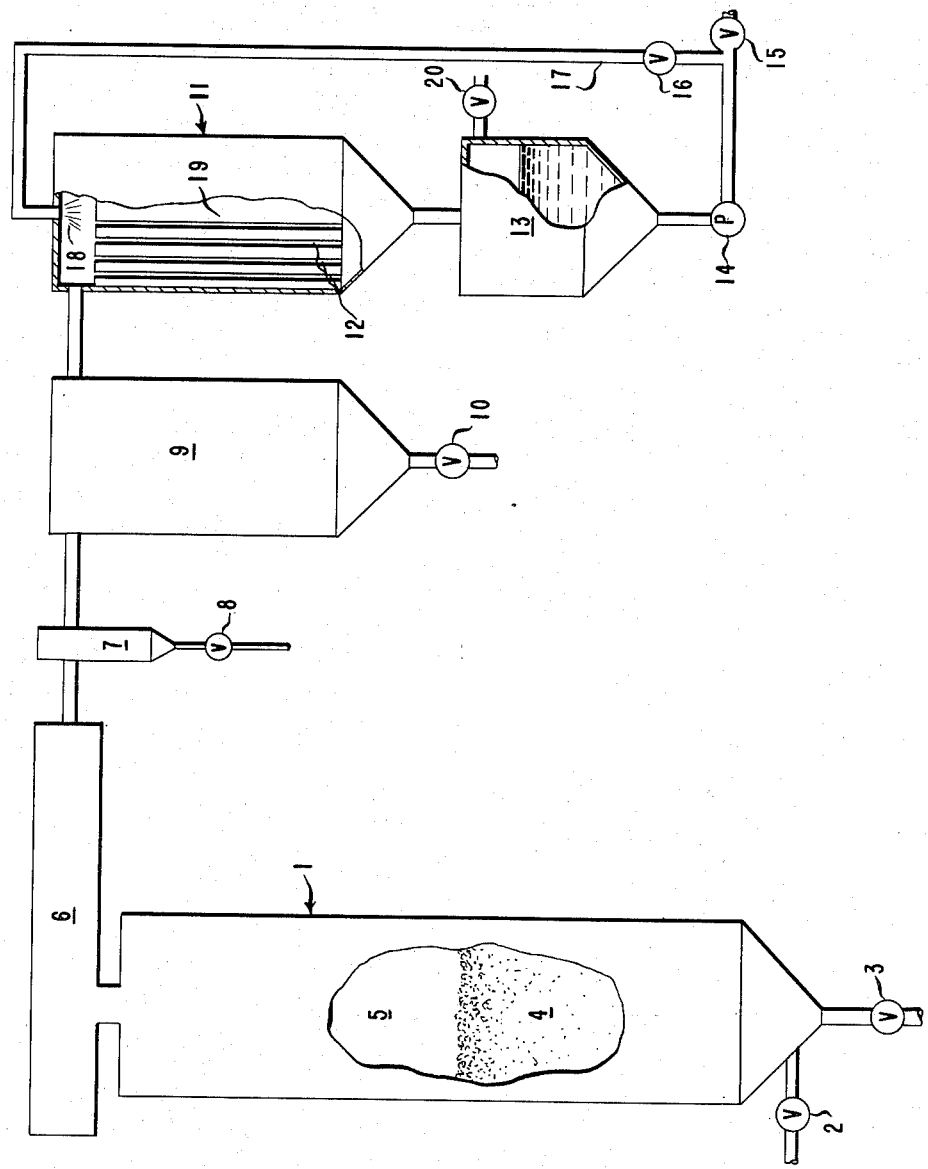
INVENTOR
HENRY F. WIGTON
BY
ATTORNEY United States Patent Office 2,952,513
Patented Sept. 13, 1960

2,952,513

PRODUCTION OF ZIRCONIUM AND SILICON CHLORIDES

Henry F. Wigton, Boulder, Colo., assignor to E. I. du Pont de Nemours & Company, Wilmington, Del., a corporation of Delaware Filed Jan. 14, 1958, Ser. No. 708,785

2 Claims. (Cl. 23—87)

This invention relates to the production of chlorides of zirconium and silicon. More particularly it relates to a novel process for the chlorination of zircon sand to obtain simultaneously, silicon tetrachloride and zirconium tetrachloride.

Zircon sand is a naturally occurring mineral with a chemical composition corresponding essentially to $ZrSiO_4$. Early attempts to chlorinate zircon resulted in very poor chlorine conversions and incomplete chlorination. To overcome these factors many devious and costly processes have been proposed and are being utilized. Normally such processes involve the pretreatment of the ore. Kroll, for instance, who worked with a shaft furnace using briquettes, reported (Bureau of Mines R.I. 4915) that "chlorination of sand without grinding is not feasible." At present, direct chlorination of zircon is not used on a commercial scale. Rather, it is usually converted to zirconium carbide by electrically furnacing with a subsequent chlorination of the carbide in a fixed bed to obtain zirconium tetrachloride.

It is an object of the present invention to provide a commercially feasible process for the direct chlorination of zircon to obtain, simultaneously, zirconium tetrachloride and silicon tetrachloride, in good yield, with high chlorine utilization without resorting to expensive alterations of the zircon ore. A more specific object is to produce anhydrous zirconium tetrachloride and silicon tetrachloride directly from zircon sand without resorting to fine grinding and briquetting processes. Further objects and advantages of the invention will be apparent from the ensuing description as well as from the accompanying drawing illustrating a form of apparatus in which the invention can be carried out.

The above and other objects and advantages are realized in this invention which broadly comprises the direct chlorination of zircon ore particles in a fluidized bed reactor in the presence of a high concentration of carbon particles, and at a temperature within the range at which zircon will react with chlorine to form zirconium and silicon chlorides, with the subsequent withdrawal of the anhydrous zirconium chloride and silicon chloride vapors for separation and recovery.

In a specific and preferred embodiment, the invention comprises chlorinating within a fluidized bed reactor granular zircon ore in the presence of carbon by continuously passing a chlorine-containing gas through said mixture to maintain said bed in ebullient condition, throughout the reaction maintaining a high ratio on the order of 1:3 to 3:4 by weight of unreacted carbon to total solids in the bed, maintaining the temperature in the reaction bed within the range of 1025 to 1150° C., continuously withdrawing the reaction product vapors, and separating and recovering the zirconium tetrachloride and silicon tetrachloride from the withdrawn products.

I have found that if a high concentration of unreacted particulate carbon is maintained in a fluidized reaction bed, an unexpectedly high yield of zirconium and silicon tetrachlorides can be obtained.

Referring to the drawing, there is shown a fluidized bed reaction chamber 1 suitably insulated to provide the desired reaction temperature and low corrosion of the refractory walls. An inlet 2 is disposed in the lower portion of the reactor through which solid reactants can be continuously or intermittently fed. An inlet 3 situated at the bottom of the reaction chamber 1 provides a means for introducing vapor reactants, and, if desired, inert gas to maintain the solids in fluidized ebullient motion in the bed 4 which is contained within the lower portion of the reaction chamber 1. Above the solids in the fluidized bed a space 5 is maintained for disengaging solids from the reaction product vapors. Above disengaging space 5 is disposed a high temperature space cooler 6 maintained at about 400° C., and through which the exit gases from the reactor pass to a small cyclone separator 7 having a discharge outlet 8 for separation and removal of the finest bed particles blown from the bed. A space cooler 9, which may be a single chamber, as shown, or multiple chambers, is provided for condensation of the zirconium tetrachloride from the product gas stream leaving the cyclone separator. The outlet 10 disposed at the bottom of cooler 9 provides means for the withdrawal of the zirconium tetrachloride from the system. A wetted wall condenser 11 containing tubes 12 externally brine cooled to about minus 20° C. is provided for complete condensation of the silicon tetrachloride contained in the exit gas from space cooler 9. Suitably disposed at the bottom of condenser 11 is a collection tank 13 which serves as storage for the silicon tetrachloride condensate, and from which said condensate may be removed by a pump 14 through outlet 15 or may be circulated through valve 16 and line 17 to the space above the wetted wall condenser 11 where a spray nozzle 18 is maintained. By means of said spray nozzle the silicon tetrachloride can be sprayed onto the tube sheet 19 and tubes 12 to maintain the interior walls of the tubes wetted with silicon tetrachloride. Disposed at the upper portion of collection tank 13 is an outlet 20 through which non-condensible gases, largely $CO_2$ and $CO$, may be removed from the system.

It is understood that the shape of the reactor and number of inlets for fluidizing gas and for solids feed may be varied as desired. As long as sufficient solids disengaging space is maintained above the bed, the reaction vessel may be of any desired diameter or height, and may have a flat or conical bottom. Materials of construction utilized will, of course, be resistant to the corrosive conditions of the reaction, a suitable refractory for the shell being high silica bricks. Space coolers and cyclone are also constructed of suitable high temperature refractory. The wetted wall condenser, because of the drastically lower temperature, can be made of steel or other desired metal.

The fluidized bed reactor is preferably operated slightly above atmospheric pressure (in the range of 2-10 p.s.i.) to avoid inleakage of moisture containing air, and to simplify control. If desired, however, pressures somewhat higher or lower may be utilized.

In producing zirconium tetrachloride and silicon tetrachloride in an apparatus such as that described, zircon ore in the form of beach sand may be used without grinding. Beach sand is normally in the particle size range of −65 to +200 mesh (U.S. standard sieves). Massive zircon ore may be ground to a comparable particle size range if it is to be used. The carbon used for a reducing agent is also utilized as relatively coarse granular material, the −8 to +100 mesh range being preferred. The solids feed to the reactor through inlet 2 is adjusted to maintain a high ratio of unreacted carbon to total solids in the bed, which is essential to achieve a high yield. A ratio of about 1:2 by weight is preferred, and acceptable results are achieved if the ratio is maintained within the range of 1:3 to 3:4. Chlorine gas is introduced into the reactor at bottom inlet 3 at a sufficient velocity to fluidize the bed and expand it to about twice its static volume. The velocity necessary would, of course, vary with the size and amount of materials in the bed. The reaction temperature is maintained within the range of 1025 to 1150° C. Due to the exothermic reaction, it is not necessary to supply heat except in a small scale reactor having very high heat losses. To increase the reaction temperature for rate control, oxygen can be supplied along with the chlorine gas. The oxygen can be supplied in any desired volume ratio compared to chlorine up to as high as about 3:2 ($O_2:Cl_2$), as long as a high $CO/CO_2$ ratio in the exit gases is maintained. A molar ratio within the range of 8:1 to 20:1 is satisfactory. This is possible by the use of high ratios of carbon to zircon ore in the feed.

To a clearer understanding of the invention, the following specific examples are given, which are merely in illustration but not in limitation of the invention.

*Example I*

An apparatus such as shown in the drawing is utilized for the continuous chlorination of zircon ore. The reaction chamber 1 was 8 inches in diameter and 10 feet in height. The unit was charged with a mixture of 50 lbs. of unground zircon beach sand (−65 +200 mesh size) and 50 lbs. of particulate coke (−35 +100 mesh). A mixture containing 4 parts zircon and 1 part coke was fed continuously into the fluidized reaction bed at a rate of about 50 lbs. per hour to maintain an expanded bed depth of about five to six feet. The expansion and fluidization of the reaction bed was obtained by introducing into the reactor chlorine through the bottom inlet 3 providing an upward gas velocity in the reaction bed of 0.9–1.0 foot per second. The bed was maintained at a temperature of about 1045–1050° C. The product gases were withdrawn from above the bed and passed through the high temperature space cooler 6, the cyclone 7 for blowover removal, and a space condenser 9 held at 150° C. to condense out the zirconium tetrachloride as a fine dust or snow. The residual gas then passed through the low temperature (−28° C.) wetted wall condenser 11 for recovery of the silicon tetrachloride. The uncondensed gases next moved through outlet 20 to discard. During the continuous operation, which was maintained for a period of about 7.5 hours by continuous ore and coke feed, a chlorine conversion of over 88% was obtained. The bed removed from the reactor after chlorination contained less than 2% of the zircon fed and the yields of zirconium tetrachloride (435 lbs.) and silicon tetrachloride (313 lbs.) obtained were over 96%. Analysis of the bed removed from the reactor indicated 51.2% carbon. The average ratio of $CO/CO_2$ in the exit gases was 12/1.

*Example II*

Utilizing the apparatus and the reactants and the throughput ratio of Example I, except that oxygen is introduced along with the chlorine to give a bed temperature of 1085° C. a chloride conversion of 95–96% was obtained. The yield of zirconium and silicon tetrachloride was above 98%. The ratio oxygen to chlorine was maintained at 2:3. Analysis of the final bed removed from the reactor indicated 43.4% carbon. Analysis of the product gas stream indicated a ratio of $CO/CO_2$ of 14/1.

The reason for the excellent conversions of chlorine and zircon obtained under the conditions I have described is that the oxygen partial pressure at the surface of the zircon particle is maintained sufficiently low by the constant close proximity of carbon particles, which as a result of the high ebullient condition and the sufficient carbon particle population produces profuse solid-to-solid contacting. The result is to effectively maintain a solid carbon concentration at the immediate reaction surface so that the extremely slight quantities of oxygen evolved by the attack of chlorine on the constituents of the zircon sand are immediately converted to carbon monoxide allowing the reaction to proceed at a very rapid rate. I have discovered that when the optimum combination of conditions as described have been provided, particularly when the carbon concentration is about half the total weight of the solids in the bed, the reaction is so rapid that efforts to extend the zircon surface by fine grinding are entirely unnecessary and wasteful. In fact, all previous attempts to obtain and maintain the necessary proximity of zircon and carbon by grinding together, briquetting, and the like have been ineffective, resulting in wastefully low utilization of mineral and chlorine alike.

The advantages of the process lie particularly in the ability to chlorinate directly the zircon ore without preliminary processing of the raw material, such as briquetting and grinding. Also, the process provides a commercially operable means in which a high yield and high reaction rate on a continuous basis is achieved to give the two urgently needed anhydrous chlorides in the same reaction system.

I claim as my invention:

1. An improved process for chlorinating zircon ore to obtain high yields of both zirconium tetrachloride and silicon tetrachloride, which comprises introducing granular zircon ore of about −65 to +200 mesh and carbon in a weight ratio of about 1:1 zircon to carbon into a fluidized bed reaction zone, continuously passing a chlorine containing gas through said zone to maintain said bed in fluidized ebullient motion, maintaining the reaction temperature of the mass within said fluidized bed within the range of 1025 to 1150° C., maintaining the weight ratio of unreacted carbon to total weight of solids in the bed at about 1:2, removing the gaseous reaction products from the reaction bed, and separating and recovering the zirconium tetrachloride and silicon tetrachloride contained therein.

2. An improved process for chlorinating zircon ore to obtain high yields of both zirconium tetrachloride and silicon tetrachloride, which comprises introducing granular zircon ore of about −65 to +200 mesh and carbon in a weight ratio of about 1:1 zircon to carbon into a fluidized bed reaction zone, continuously passing chlorine and oxygen through said zone to maintain said bed in fluidized ebullient motion, maintaining the reaction temperature of the mass in said fluidized bed within the range of about 1025 to 1150° C., maintaining the weight ratio of unreacted carbon to total weight of solids in the bed at about 1:2, maintaining the molar ratio of $CO/CO_2$ in the reactor exit gases within the range of 8:1 to 20:1, removing the gaseous reaction products from the reaction bed, and separating and recovering the zirconium tetrachloride and silicon tetrachloride contained therein.

References Cited in the file of this patent

FOREIGN PATENTS 759,724     Great Britain _____ Oct. 24, 1956

OTHER REFERENCES

U.S. Bureau of Mines Report of Investigations No. 4915 (November 1952), pp. 3 and 4.